(12) United States Patent
Naraki et al.

(10) Patent No.: US 6,422,371 B1
(45) Date of Patent: Jul. 23, 2002

(54) CENTRIFUGAL FRICTION CLUTCH FOR AUTOMATIC TRANSMISSION

(75) Inventors: Tetsuo Naraki; Eiichiro Kawahara; Tsukasa Takahashi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/703,680

(22) Filed: Nov. 2, 2000

(30) Foreign Application Priority Data

Dec. 17, 1999 (JP) .......................................... 11-360027

(51) Int. Cl.[7] .............................................. F16D 43/08
(52) U.S. Cl. .................................................. 192/105 C
(58) Field of Search ...................... 192/105 C; 475/258, 475/267

(56) References Cited

U.S. PATENT DOCUMENTS

| | | | | |
|---|---|---|---|---|
| 1,950,581 A | * | 3/1934 | Thomas | 192/105 C |
| 2,003,324 A | * | 6/1935 | Vail | 192/105 C |
| 4,111,291 A | * | 9/1978 | Horstman | 192/405 C |
| 4,732,251 A | * | 3/1988 | Tipton | 192/105 C |
| 5,409,428 A | * | 4/1995 | Antonov | 192/105 C |
| 5,733,217 A | * | 3/1998 | Naraki et al. | 192/103 A |
| 5,885,180 A | * | 3/1999 | Antonov | 475/116 |

FOREIGN PATENT DOCUMENTS

JP 9-014436 1/1997

\* cited by examiner

Primary Examiner—Rodney H. Bonck
(74) Attorney, Agent, or Firm—Arent Fox Kintner Plotkin & Kahn, PLLC (57) ABSTRACT

A centrifugal friction clutch for an automatic transmission includes axially movable friction elements supported on and rotated with an input member. Axially slidable clutch elements are supported on a clutch cover, wherein centrifugal weights held by spring members are disposed at predetermined positions on the clutch cover. First retaining means on the clutch cover press the friction members and clutch members against each other so that power can be transmitted when the centrifugal weights are displaced. A first spring bearing member contacting one end of each of the spring members urges the centrifugal weights toward their initial positions while a second spring bearing member contacting the other end of each of the spring members is held in place on the clutch cover by second retaining means engaging the clutch cover. The first and second bearing members are axially movable relative to the input member.

3 Claims, 11 Drawing Sheets

CENTRIFUGAL FRICTION CLUTCH FOR AUTOMATIC TRANSMISSION

BACKGROUND OF THE INVENTION

1. Field of the Invention

The present invention relates to a centrifugal friction clutch for an automatic transmission, including a friction clutch unit and centrifugal weights capable of engaging and disengaging the friction clutch unit according to centrifugal force acting thereon.

2. Description of the Related Art

Figure 16:
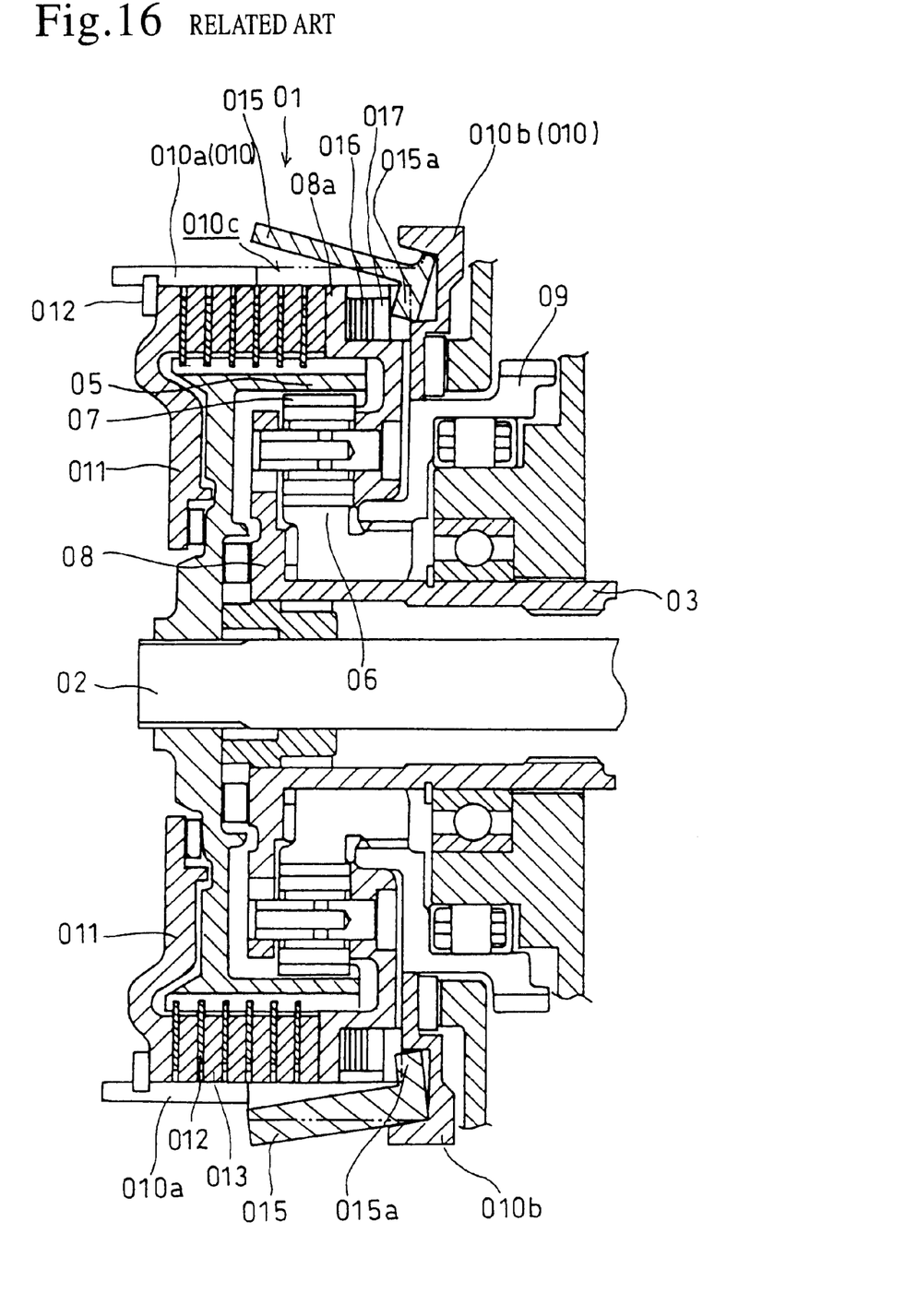
FIG. 16 is a half longitudinal sectional view of an automatic transmission including a prior art centrifugal friction clutch.

FIG. 16 shows a prior art centrifugal friction clutch for an automatic transmission, disclosed in JP-A No. Hei 9-14436. Referring to FIG. 16, an automatic transmission 01 is provided with a planetary gear including an input shaft 02, an output shaft 03 coaxially supported for rotation on the input shaft 02, a ring gear 05, which is a helical gear, splined to the input shaft 02, a sun gear 06, which is a helical gear, connected to a one-way clutch by a rotating member 09, a carrier 08 formed integrally with the output shaft 03, and planet pinions 07, which are helical gears, supported on the carrier 08. A pressure receiving member 08a is connected to the carrier 08 formed integrally with the output shaft 03. A clutch cover 010 is supported on the pressure receiving member 08a so as to be axially movable relative to the pressure receiving member 08a and to rotate together with the pressure receiving member 08a. The clutch cover 010 has a cylindrical wall 010a surrounding the pressure receiving member 08a, an outer end wall 010b formed at one end of the cylindrical wall 010a. A pressure member 011 is fitted in the cylindrical wall 010a opposite to the pressure receiving member 08a and is retained in the cylindrical wall 010a by a snap ring 012. A plurality of friction disks 012 are interposed between the pressure receiving member 08a and the pressure member 011 and are mounted on the ring gear 05 so as to be axially movable relative to the ring gear 05 and to be rotatable together with the ring gear 05, and a plurality of clutch disks 013 are fitted in the cylindrical wall 010a of the clutch cover 010 so as to be axially movable relative to the cylindrical wall 010a and to be rotatable together with the cylindrical wall 010a. The friction disks 012 and the clutch disks 013 are arranged alternately. A plurality of rectangular openings 010c are formed in a portion of the cylindrical wall 010a of the clutch cover 010 near the outer end wall 010b in a circumferential arrangement, and centrifugal weights 015 are fitted in the rectangular openings 010c. Coned disk springs 016 and an annular bearing member 017 are interposed between the outer end wall 010b of the clutch cover 010 and the pressure receiving member 08a so that base portions 015a of the centrifugal weights 015 are held between the annular bearing member 017 and the outer end wall 010b.

When an engine by which the automatic transmission is driven is stopped, the centrifugal weights 015 are held at positions indicated by two-dot chain lines in FIG. 16 by the coned disk springs 016 so as to engage a centrifugal friction clutch lightly, in which the pressure member 011 is pressed lightly against the pressure receiving member 08a.

When the engine operates at a very low engine speed, the driving torque of the engine is transmitted to the planetary gear, and the pressure receiving member 08a and the pressure member 011 are spaced apart by the thrust produced by the helical gears of the planetary gear. Consequently, the friction disks 012 and the clutch disks 013 interposed between the adjacent friction disks are separated and the centrifugal friction clutch is disengaged.

When the engine operates at high engine speeds, the centrifugal weights 015 are turned radially outward to positions indicated by continuous lines in FIG. 16 by centrifugal force. Consequently, the base portions 015a of the centrifugal weights 015 presses the annular bearing member 017 to press the coned disk springs 016 against the pressure receiving member 081 which is restrained from axial movement. The resilience of the coned disk springs 016 acts through the base portions 015a of the centrifugal weights 015 on the outer end wall 010b of the clutch cover 010. Consequently, the clutch cover 010 pushes the pressure member 011 to the right, as viewed in FIG. 16 through the snap ring 012, the distance between the pressure receiving member 08a and the pressure member 011 is reduced, the friction disks 012 are pressed against the clutch disks 013 and thereby the centrifugal friction clutch is engaged.

When changing the friction disks 012 and the clutch disks 013 of the centrifugal friction clutch for maintenance, the snap ring 012 is removed, the pressure member 011 is removed, and then the friction disks 012 and the clutch disks 013 are removed. The clutch cover 010 is released from the pressure receiving member 08a when the snap ring 012 is removed. Consequently, the coned disk springs 016 are unloaded, the centrifugal weights 015 fall out of the clutch cover 010. Therefore, troublesome work for assembling the centrifugal weights 015 and the clutch cover 010 is necessary when reassembling the centrifugal friction clutch, which makes maintenance more troublesome.

The present invention has been made in view of such a problem and it is therefore an object of the present invention to provide a centrifugal friction clutch for an automatic transmission, capable of being easily disassembled and assembled for maintenance.

SUMMARY OF THE INVENTION

According to a first aspect of the present invention, a centrifugal friction clutch for an automatic transmission includes an input member; friction elements supported on the input member so as to be axially movable and to be rotated together with the input member; an output member; a clutch cover supported on the output member so as to be axially movable relative to the output member and to rotate together with the output member; clutch elements supported on the clutch cover so as to be axially slidable; centrifugal weights disposed at predetermined positions on the clutch cover; spring members holding the centrifugal weights in place; and first retaining means put in place on the clutch cover to press the friction members and the clutch members against each other so that power can be transmitted when the centrifugal weights are displaced by centrifugal force to move the clutch cover relative to the output member; wherein a first spring bearing member placed in contact with one end of each of the spring members urges the centrifugal weights toward their respective predetermined initial positions, and a second spring bearing member placed in contact with the other end of each of the spring members is held in place on the clutch cover by second retaining means engaging the clutch cover.

The spring members are held between the first and the second spring bearing member supported on the clutch cover so as to bias the centrifugal weights toward their respective predetermined initial positions, i.e., positions where the centrifugal weights are held by the spring members when the centrifugal friction clutch is assembled. Thus, the first and the second spring bearing members, the spring members and the centrifugal weights are assembled in a unit on the clutch cover. Therefore, the members assembled in a unit on the clutch cover d not come apart even if the clutch cover is disengaged from the output member by removing the first retaining means, the friction elements and the clutch elements are removed for maintenance or the like. Thus, the centrifugal friction clutch can be easily assembled and disassembled.

Preferably, the second retaining means is formed integrally with the second spring bearing member. When the second retaining means is formed integrally with the second spring bearing member, the number of component parts is reduced and assembling work is facilitated.

Preferably, the second spring bearing member is not in contact with the output member and is supported on the clutch cover such that a clearance is secured between the output member and the first retaining means. Since the spring members are not initially supported on the clutch cover and not held between the clutch cover and the output member, a space between the output member, and the first retaining means attached to the clutch cover can be optionally determined and hence the clearance can be secured between the output member and the first retaining means. Accordingly, the resilience of the spring members is not exerted on the friction elements and the clutch elements an initial state, the unnecessary frictional engagement of the friction elements and the clutch elements can be avoided, which improves the durability of the centrifugal friction clutch.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

An automatic transmission 1 including a centrifugal friction clutch in a first embodiment according to the present invention will be described with reference to FIGS. 1 to 9. The automatic transmission 1 is a two-speed transmission provided with a planetary gear 4. The planetary gear 4 has a ring gear 5 splined to an input shaft 2 connected to the crankshaft of an internal combustion engine, not shown, a sun gear 6 interlocked with a fixed member through a one-way clutch 6a, planet pinions 7 respectively having support shafts 7a and engaging the ring gear 5 and the sun gear 6, an inner carrier 8 supporting one end of each support shaft 7a, restrained from axial movement and supported for rotation on the input shaft, and an outer carrier 9 supporting the other end of each support shaft 7a and having a peripheral portion serving as a pressure receiving portion 9a.

Figure 1:
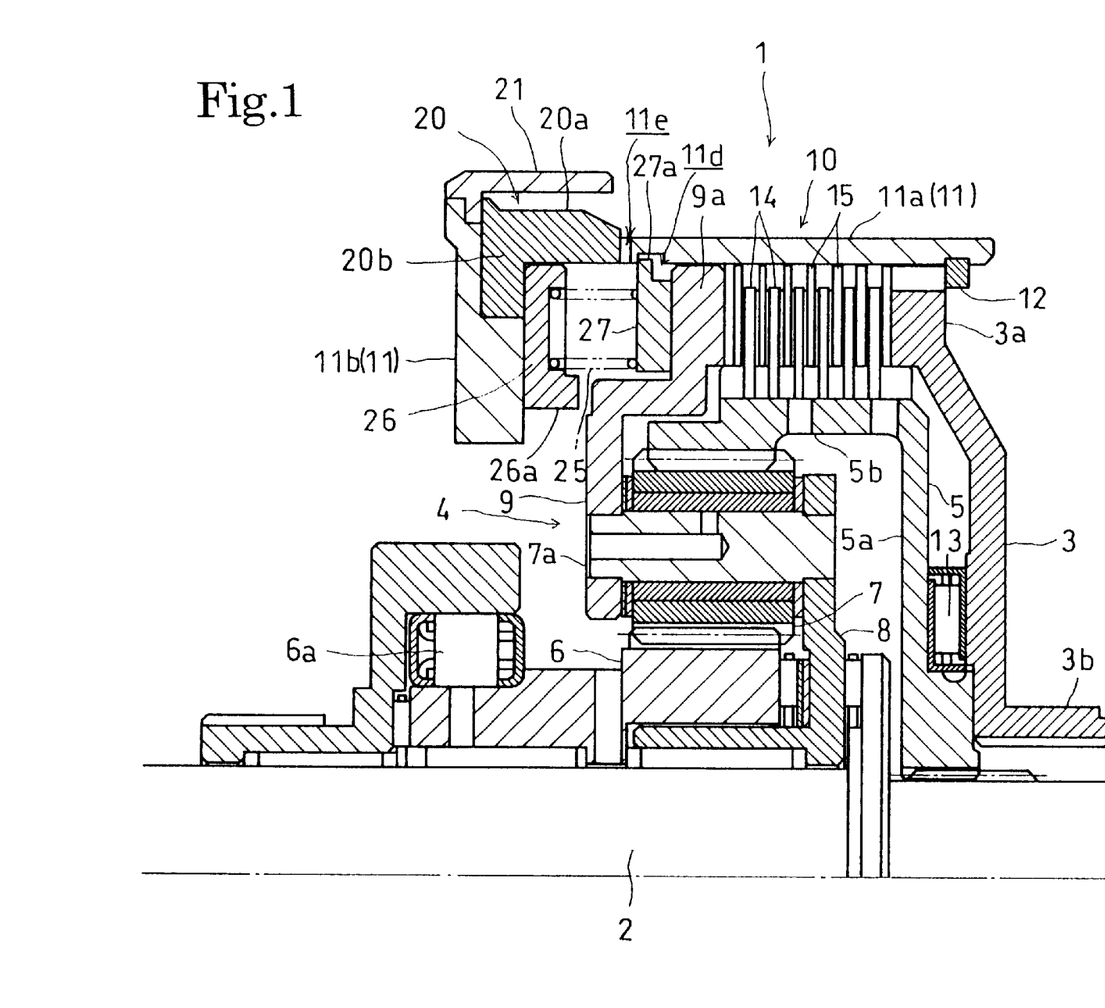
FIG. 1 is a half longitudinal sectional view of an automatic transmission including a centrifugal friction clutch in a first embodiment according to the present invention in an inoperative state.

A centrifugal friction clutch 10 is disposed so as to surround the planetary gear 4. The centrifugal friction clutch 10 has a clutch cover 11 having a cylindrical wall 11a supported on the outer carrier 9. The clutch cover 11 is axially movable relative to the outer carrier 9 and rotates together with the outer carrier 9. A disk-shaped out put member 3 is fitted in an open end of the cylindrical wall 11a of the clutch cover 11. The output member 3 is axially movable relative to the cylindrical wall 11a and is restrained from rotation relative to the cylindrical wall 11a. The output member 3 is retained in the cylindrical wall 11a by a snap ring 12, i.e., first retaining means, fitted in an annular groove formed in the inner circumference of brim of the cylindrical wall 11a. The output member 3 has a peripheral portion serving as a pressing portion 3a, and a boss serving as an output shaft 3b. The rotation of the outer carrier 9 of the planetary gear 4 is transmitted directly to the output member 3. The outer carrier 9 is the output member of the planetary gear 4.

The ring gear 5 has a disk-shaped portion 5a and a cylindrical portion 5b provided with internal gear teeth. A thrust bearing 13 is interposed between the disk-shaped portion 5a and the output member 3. The cylindrical portion 5b is surrounded by the cylindrical wall 11a of the clutch cover 11. A plurality of friction disks 14, i.e., friction elements, and a plurality of clutch disks 15, i.e., clutch elements, are arranged alternately in a space between the pressure receiving portion 9a of the outer carrier 9 and the pressing portion 3a of the output member 3. The friction disks 14 are fitted on the cylindrical portion 5a of the ring gear 5. The clutch disks 15 are fitted in the cylindrical wall 11a of the clutch cover 11. The friction disks 14 is axially movable relative to the ring gear 5 and is restrained from rotation relative to the ring gear 5. The clutch disks 15 are axially movable relative to the clutch cover 11 and is restrained from rotation relative to the clutch cover 11.

Figure 2:
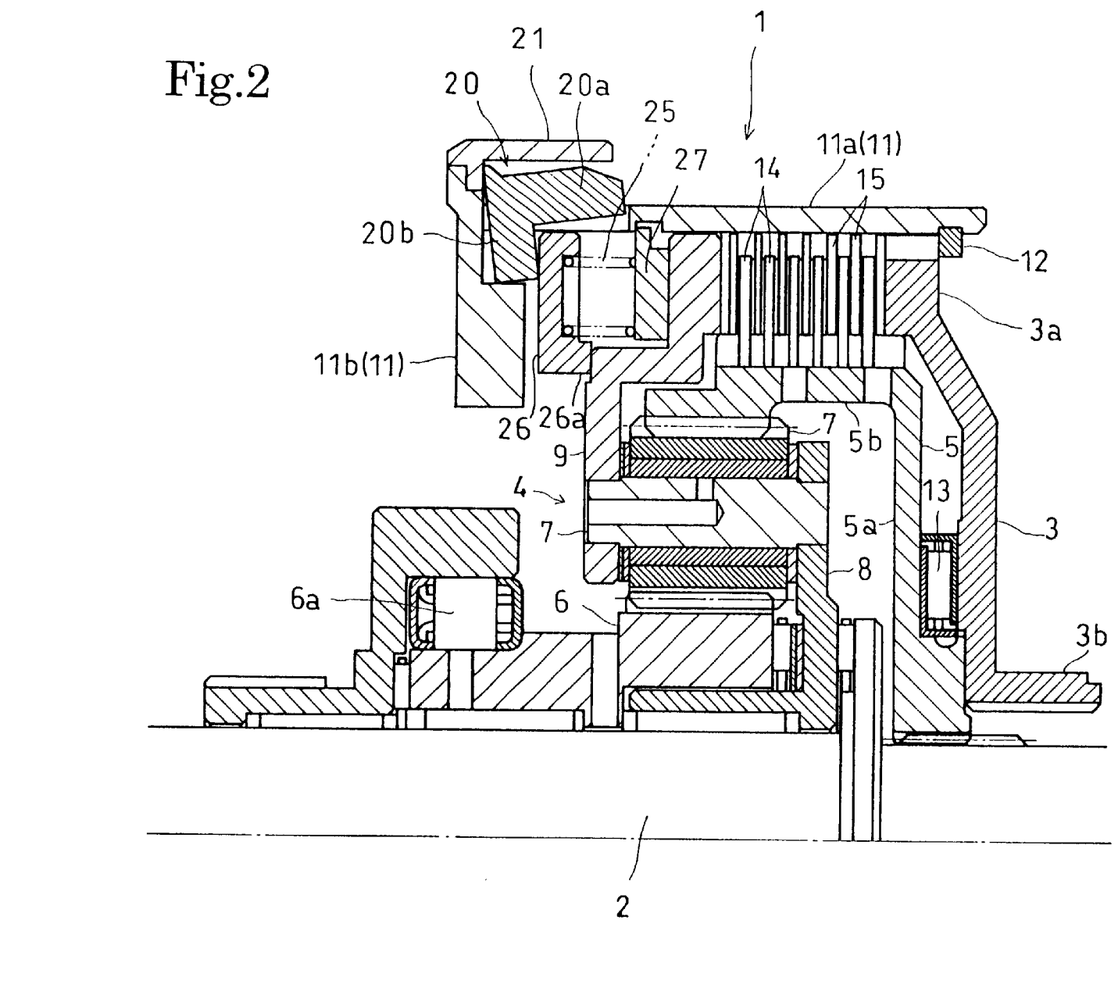
FIG. 2 is a half longitudinal sectional view of the automatic transmission shown in FIG. 1 in operation at a high rotating speed.
Figure 3:
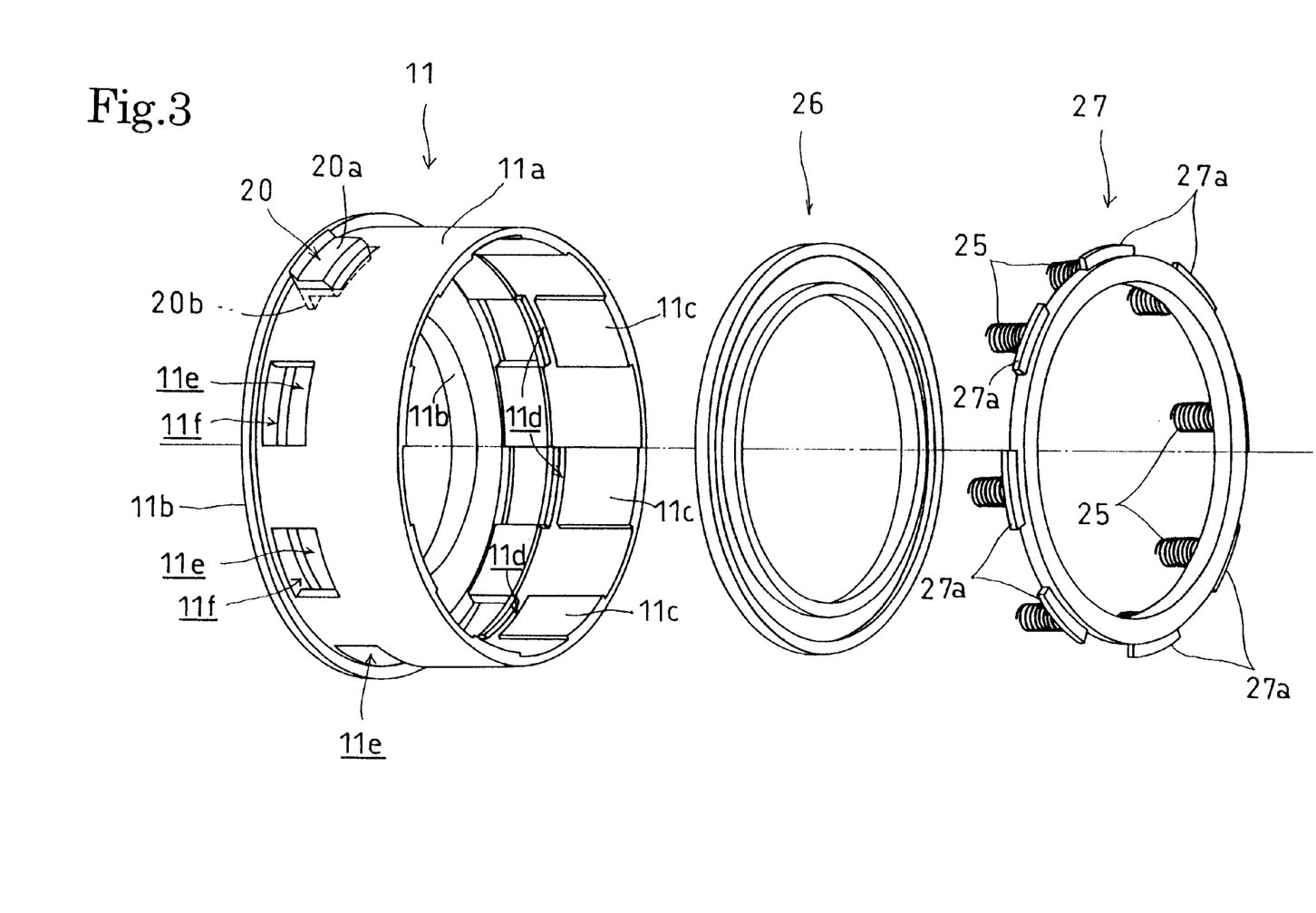
FIG. 3 is an exploded perspective view of the centrifugal friction clutch included in the automatic transmission shown in FIG. 1.

As shown in FIG. 3, the clutch cover 11 has the cylindrical wall 11a and an annular end wall 11b continuous with one end of the cylindrical wall 11a. A plurality of axial protrusions 11c are formed on the inner circumference of the cylindrical wall 11a. A circumferential groove 11d is formed in a predetermined portion of each axial protrusion 11c. A plurality of rectangular openings 11e are formed in portions of the cylindrical wall 11a near the end wall 11b. Centrifugal weights 20 are fitted in the rectangular openings 11e, respectively. A cylindrical limiting member 21 is attached to the circumference of the annular end wall 11b so as to cover the rectangular openings 11e as shown in FIGS. 1 and 2.

Each of the centrifugal weight 20 has a substantially L-shaped cross section and has a main portion 20a and a base portion 20b extending perpendicularly from the outer end of the main portion 20a. As shown in FIG. 1, the main portion 20a is fitted in the rectangular opening 11e of the clutch cover 11 with the base portion 20b fitted in a recess 11f formed in the annular end wall 11b. A first spring bearing member 26 is pressed against the base portions 20b by the resilience of springs 25. A second spring bearing member 27 in contact with the inner ends of the springs 25 is pressed against the outer surface of the pressure receiving portion 9a of the outer carrier 9. The first spring bearing member 26 and the second spring bearing member 27 are annular plates. The springs 25 extended axially and arranged at angular intervals are compressed between the first spring bearing plate 26 and the second spring bearing plate 27. The first spring bearing plate 26 and the second spring bearing plate 27 are disposed in a space between the base portions 20b of the centrifugal weight 20 (the annular end wall 11b of the clutch cover 11) and the pressure receiving portion 9a of the outer carrier 9. One end of each spring 25 is connected to the second spring bearing member 27 by staking. The other end of the spring 25 may be connected to the first spring bearing member 26 by staking or the both ends of the spring 25 may be connected to the spring bearing members 26 and 27, respectively, by staking.

Figure 4:
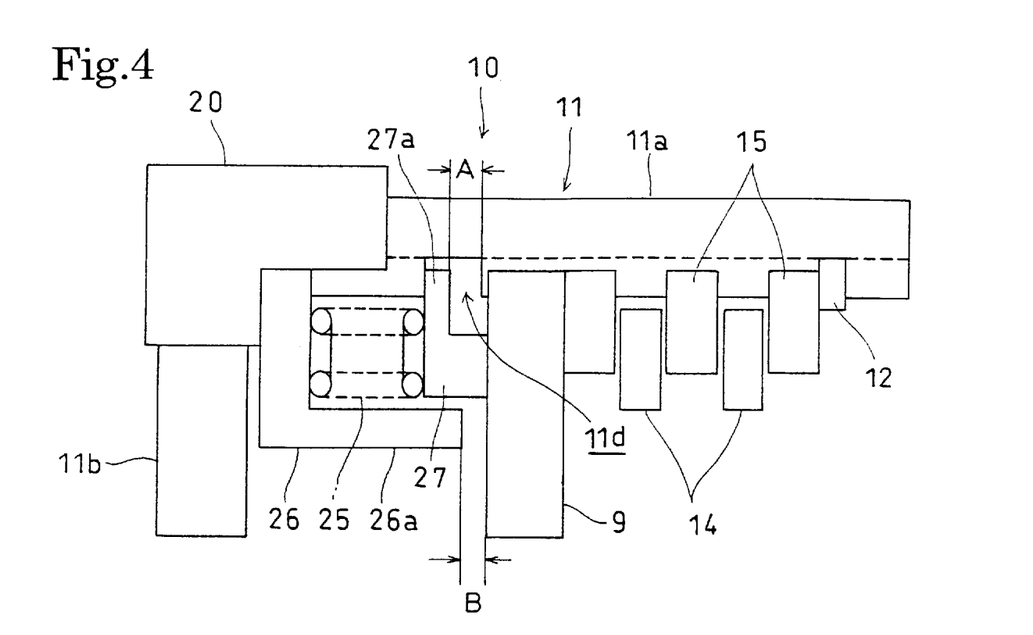
FIG. 4 is a schematic typical view of the centrifugal friction clutch shown in FIG. 1 in an inoperative state.
Figure 5:
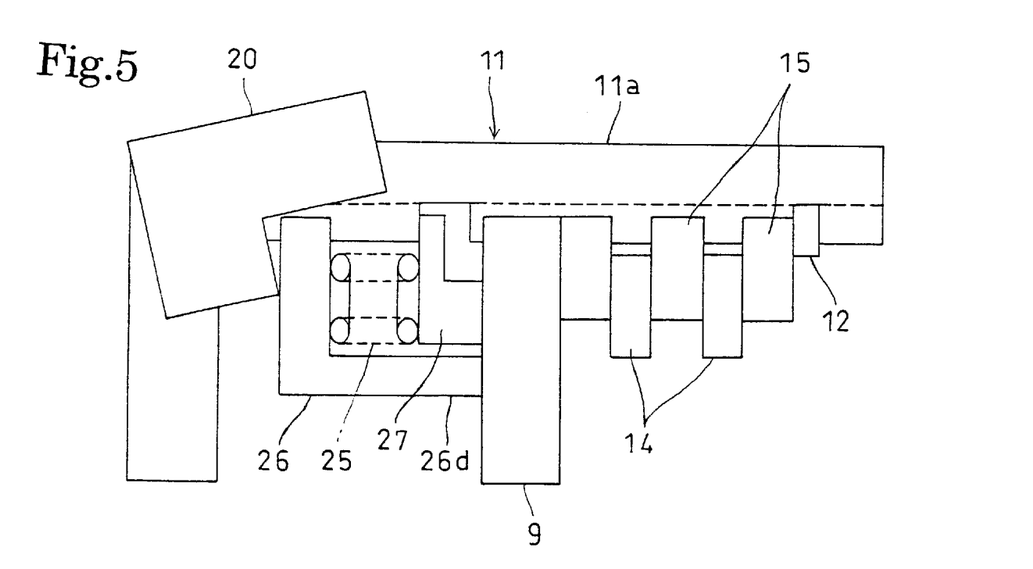
FIG. 5 is a schematic typical view of the centrifugal friction clutch shown in FIG. 1 in operation at a high rotating speed.

The second spring bearing member 27 is provided with projections 27a i.e., second retaining means, on its outer circumference. The second spring bearing member 27 is fitted in the cylindrical wall 11a of the clutch cover 11 with the projections 27a received in axial grooves formed between the adjacent axial protrusions 11c in the inner circumference of the cylindrical wall 11a of the clutch cover 11, and then the second spring bearing member 27 is turned with the projections 27a aligned with the circumferential grooves 11d formed in the axial protrusions 27a so that the projections 27a are inserted in the circumferential grooves 11d to retain the second spring bearing member 27 on the clutch cover 11. The width of the circumferential grooves 11d is greater than the thickness of the projections 27a by a length A as shown in FIG. 4.

When the outer carrier 9 is fitted in the cylindrical wall 11a of the clutch cover 11, a plurality of axial projections 9b projecting from the outer circumference of the outer carrier 9 extend on the opposite sides, respectively, of the projections 27a of the second spring bearing member 27 retained in the cylindrical wall 11a of the clutch cover 11 to keep the projections 27a in the circumferential grooves 11d, so that the second spring bearing member 27 is unable to turn relative to the cylindrical wall 11a and to come off the clutch cover 11.

An assembling procedure for assembling the automatic transmission 1 provided with the centrifugal friction clutch 10 will be described with reference to FIGS. 6 to 9.

Figure 6:
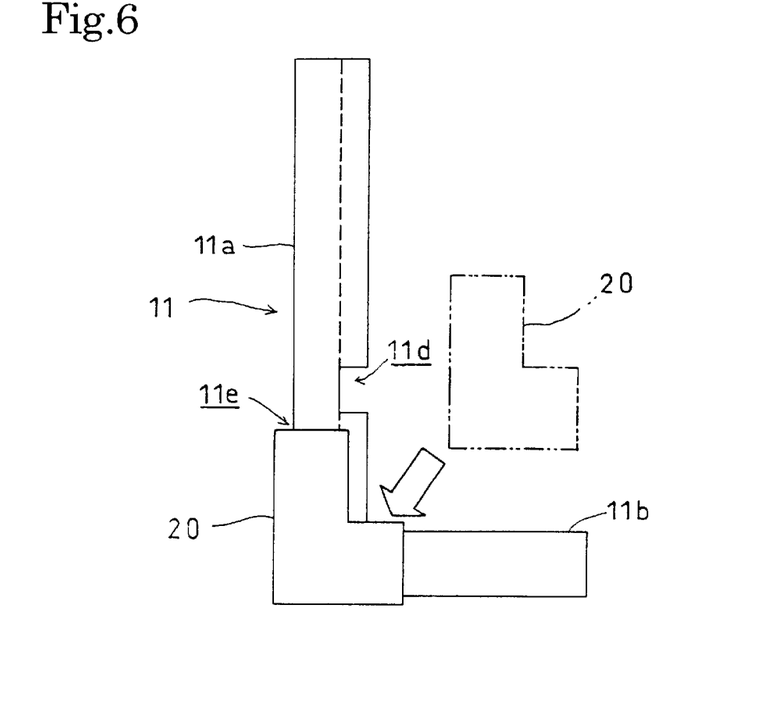
FIG. 6 is a schematic typical view of assistance in explaining a step of an assembling procedure for assembling the automatic transmission shown in FIG. 1.

Referring to FIG. 6, the clutch cover 11 is set in a vertical position with the annular end wall 11b resting on a support, and the centrifugal weights 20 are fitted in the rectangular openings 11e, respectively.

Figure 7:
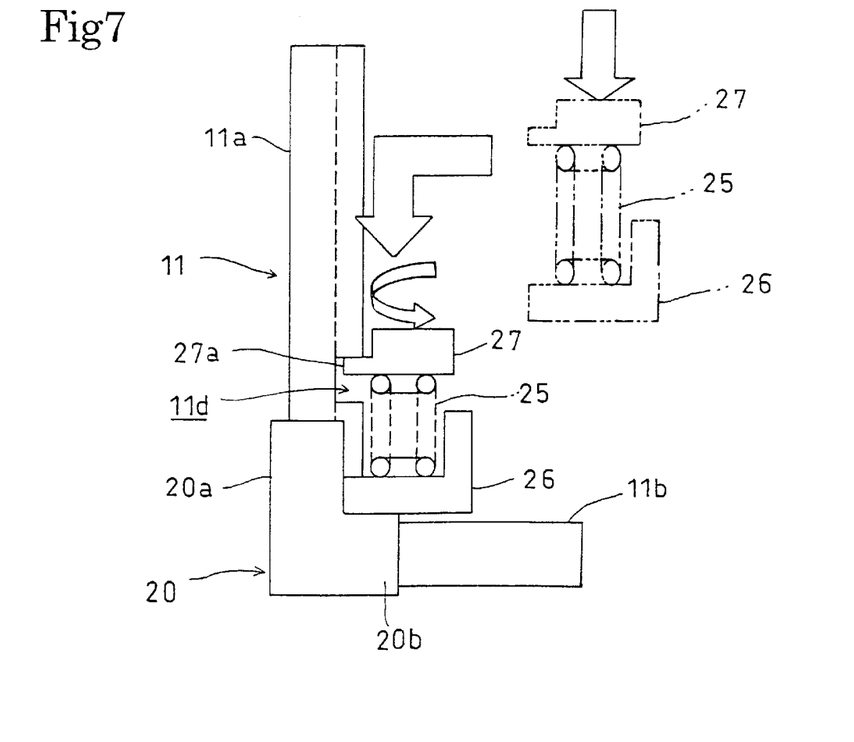
FIG. 7 is a schematic typical view of assistance in explaining a step of the assembling procedure for assembling the automatic transmission shown in FIG. 1.

Subsequently, as shown in FIG. 7, the first spring bearing member 26, the springs 25 and the second spring bearing member 27 are inserted in that order in the cylindrical wall 11a of the clutch cover 11. The second spring bearing member 27 is inserted in the cylindrical wall 11a with the projections 27a thereof aligned with the axial grooves formed in the inner circumference of the cylindrical wall 11a. Upon the coincidence of the projections 27a with the circumferential grooves 11d, the second spring bearing member 27 is turned to insert the projections 27a in the circumferential grooves 11d to retain the second spring bearing member 27 in the cylindrical wall 11a.

In this state, the springs 25 are compressed, the second spring bearing member 27 is retained on the clutch cover 11 and the first spring retaining member 26 is pressed against the base portions 20b of the centrifugal weights 20. Therefore, the springs 25 and the centrifugal weights 20 do not come off the clutch cover 11.

Figure 8:
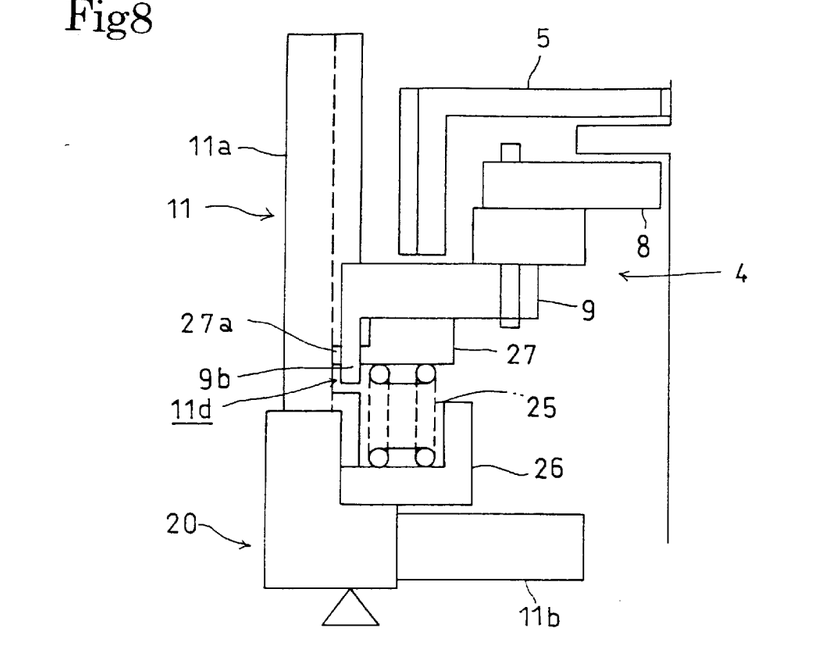
FIG. 8 is a schematic typical view of assistance in explaining a step of the assembling procedure for assembling the automatic transmission shown in FIG. 1.
Figure 9:
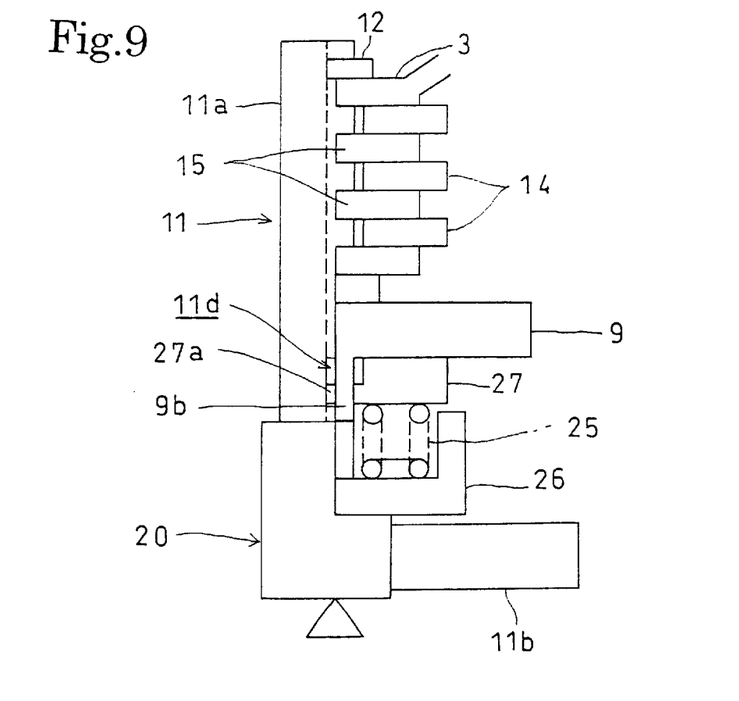
FIG. 9 is a schematic typical view of assistance in explaining a step of the assembling procedure for assembling the automatic transmission shown in FIG. 1.

Then, as shown in FIG. 8, the planetary gear 4 is incorporated into the centrifugal friction clutch 10. The outer carrier 9 is inserted in the cylindrical wall 11a of the clutch cover 11 so that the axial projections thereof lie on the opposite sides of the projections 27a of the second spring bearing 27 inserted in the circumferential grooves 11d to restrain the outer carrier 9 from turning relative to the clutch cover 11. The friction disks 14 and the clutch disks 15 are inserted alternately in a space between the cylindrical wall 11a of the clutch cover 11 and the cylindrical portion 5b of the ring gear 5, the output member 3 is fitted in the cylindrical wall 11a against the resilience of the springs 25, and the snap ring 12 is fitted in the annular groove formed in the inner circumference of the brim of the cylindrical wall 11a as shown in FIG. 9.

The plurality of centrifugal weights 20 fitted in the rectangular openings 11e of the clutch cover 11 is held in place on the clutch cover 11 by the resilience of the springs 25 as shown in FIG. 7 during assembling. Therefore, the springs 25 and the centrifugal weights 20 do not come off easily, which facilitates the subsequent assembling work.

FIG. 1 shows the automatic transmission 1 thus assembled in a inoperative state, and FIG. 4 is a schematic typical view of the centrifugal friction clutch 10. The first spring bearing member 26 is provided on its inner circumference with a projection 26a. The projection 26a is spaced a predetermined distance B apart from the carrier 9 while the centrifugal friction clutch 10 is in an inoperative state. The deflection S1=(Free length)−(Set length) in a state where the centrifugal friction clutch 10 is inoperative is greater than the length A. Therefore, the centrifugal weights 20 are held in place by the resilience of the springs 25 at a stage of assembling shown in FIG. 7 and hence the centrifugal weights 20 and the springs 25 do not come off the clutch cover 11.

Suppose that the friction disks 14 and the clutch disks 15 are abraded and their thickness is reduced by an abrasion thickness loss C. While the abrasion thickness loss C is smaller than the length A, i.e., a distance by which the projections 27a are able to move axially in the circumferential grooves 11d, the springs 25 are compressed and hence the springs 25 do not come off the clutch cover 11. Thus, the deflection S1, the length A and the abrasion thickness loss C must meet an inequality: S1>A>C.

While the centrifugal friction clutch 10 is in an inoperative state as shown in FIGS. 1 and 4, the springs 25 are compressed slightly and the centrifugal friction clutch 10 is engaged lightly. When the engine operates at a very low engine speed, the planetary gear 4 is driven by the driving torque of the engine and the component helical gears of the planetary gear 4 produce thrust. Consequently, the friction disks 14 are separated from the clutch disks 15 and hence the centrifugal friction clutch is disengaged. The rotation of the input shaft 2 is transmitted to the ring gear 5, the ring gear 5 drives the planet pinions 7 for rotation and revolution around the sun gear 6 which is permitted to rotate only in one direction by the one-way clutch 6a. Consequently, the outer carrier 9 rotates together with the clutch cover 11 and the output member 3. Thus, the output member 3 (the outer carrier 9) rotates at a rotating speed lower than that of the input shaft 2 (ring gear 5) while the centrifugal friction clutch 10 is disengaged.

When the rotating speed of the outer carrier 9 is increased to increase traveling speed, the centrifugal weights 20 are turned radially outward as shown in FIG. 2 by centrifugal force and the base portions 20b of the centrifugal weights 20 push and displace the first spring bearing 26 axially against the resilience of the springs 25 as shown in FIG. 2. Upon the axial movement of the first spring bearing member 26 by the distance B, the projection 26a comes into contact with the outer carrier 9 restrained from axial movement. The centrifugal weights 20 turn further on edges of the inner extremities of the base portions 20b in contact with the first spring bearing member 26, so that outer portions of the base portions 20b in contact with the annular end wall 11b of the clutch cover 11 pushes the clutch cover 11 to the left, as viewed in FIG. 2. Consequently, the clutch cover 11 is moved together with the output member 3 to the left, as viewed in FIG. 1, to compress the friction disks 14 and the clutch disks 15 between the pressure receiving portion 9a of the outer carrier 9 and the pressing portion 3a of the output member 3, so that the centrifugal friction clutch 10 is engaged. When the centrifugal friction clutch 10 is thus engaged, the input shaft (ring gear 5) and the output member 3 (the outer carrier 9) are coupled together to transmit the rotation of the input shaft 2 directly to the output member 3. Thus, the automatic transmission 1 is a two-speed transmission that can be set for a low speed when the centrifugal friction clutch 10 is disengaged and for a high speed when the centrifugal friction clutch 10 is engaged. The maximum deflection S2 of the springs 25 is determined so as to meet an inequality: S2>B+C, where B is the distance of free travel of the first spring bearing member 26 and C is the abrasion thickness loss of the friction disks 14 and the clutch disks 15.

When changing the friction disks 14 and the clutch disks 15 of the centrifugal friction clutch 10 of the two-speed automatic transmission 1 for maintenance, the snap ring 12 is removed, the output member 3 is removed from the clutch cover 11, and then the friction disks 14 and the clutch disks 15 are removed from the clutch cover 11. This procedure is reversed to place new friction disks and new clutch disks in the clutch cover 11. During maintenance, the plurality of centrifugal weights 20 are held in place by the springs 25 as shown in FIG. 7 and hence the plurality of centrifugal weights 20 do not come off the clutch cover 11, which facilitates disassembling and assembling work.

An automatic transmission 31 provided with an centrifugal friction clutch 40 in a second embodiment according to the present invention will be described hereinafter. In the automatic transmission 1 provided with the centrifugal friction clutch 10 in the first embodiment, the ring gear 5 is an input member, the outer carrier 9 is an output member, and the sun gear 6 coupled with the one-way clutch 6a is a fixed member. In the automatic transmission 31 in the second embodiment, a sun gear is used as an input member and a ring gear is coupled with a one-way clutch and is used as a fixed member.

Figure 10:
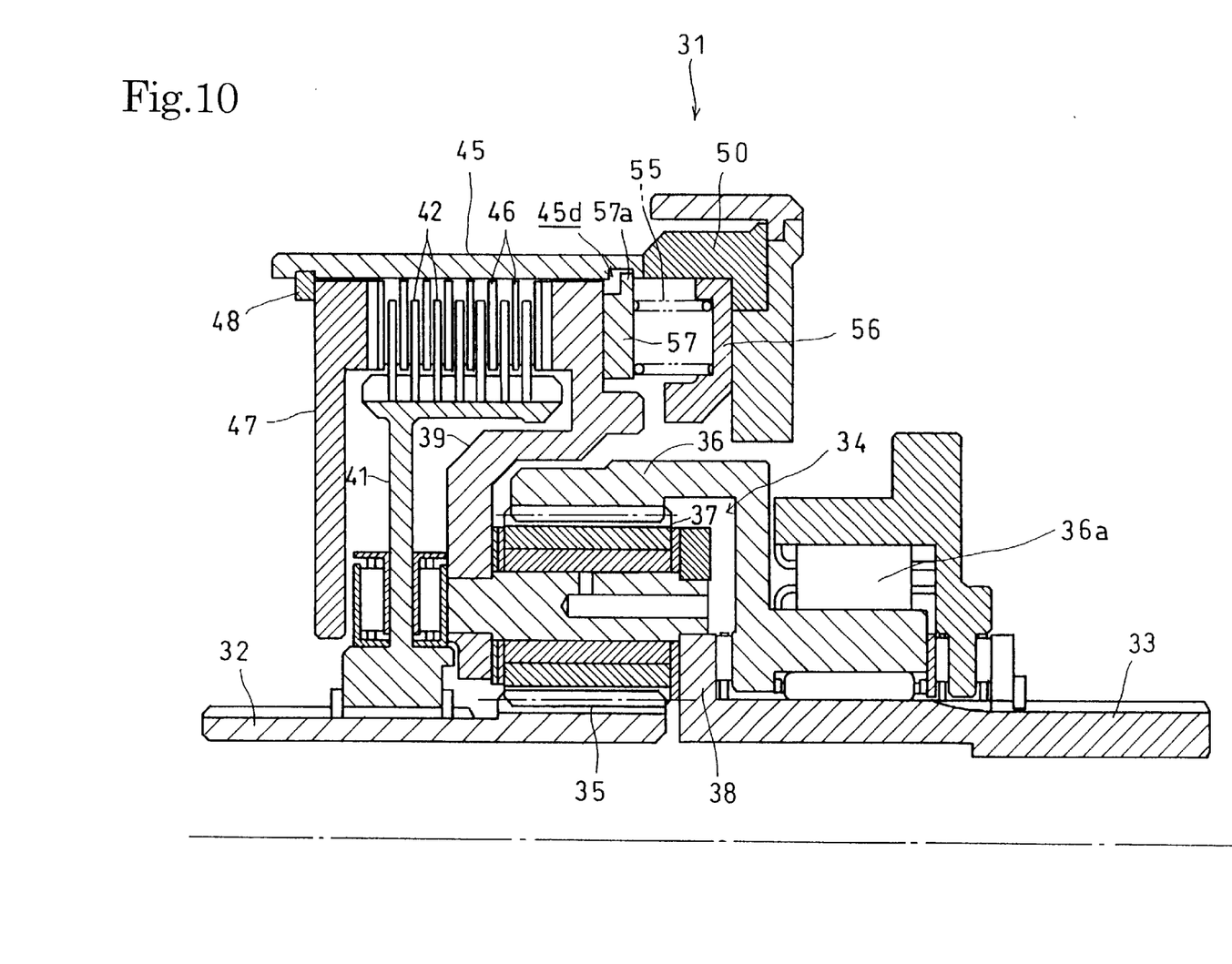
FIG. 10 is a half longitudinal sectional view of an automatic transmission including a centrifugal friction clutch in a second embodiment according to the present invention.

Referring to FIG. 10, the automatic transmission 31 is provided with a planetary gear 34 including a sun gear 35 formed integrally with an input shaft 32, a ring gear 36 connected through a one-way clutch 36a to a fixed member, planet pinions 37, and a carrier 38 supporting planet pinions 37 and formed integrally with an output shaft 33.

The centrifugal friction clutch 40 includes an input member 41 mounted on the input shaft 32 for rotation together with the input shaft 32, friction disks 42 mounted on the input member 41, a clutch cover 45 supported for axial movement on an outer carrier 39 on the outer side of the planet pinions 37, clutch disks 46 arranged on the clutch cover 45, and a pressing member 47 fitted in one end of a cylindrical wall of the clutch cover 45 and retained in place with a snap ring 48. The friction disks 42 and the clutch disks 46 are arranged alternately.

A plurality of rectangular openings are formed in portions of the cylindrical wall of the clutch cover 45 near an annular end wall covering the other end of the cylindrical wall. Centrifugal weights 50 are fitted in the rectangular openings, respectively. The centrifugal weights 50 are held in place by springs 55 held between a first spring bearing member 56 and a second spring bearing member 57, and placed between the outer carrier 39 and the annular end wall of the clutch cover 45. The second spring bearing member 57 is provided on its outer circumference with projections 57a. The projections 57a, similarly to the projections 27a of the second spring bearing member 27 of the first embodiment, are received in circumferential grooves 45d formed in the inner surface of the clutch cover 45 so as to be axially movable in the circumferential grooves 45d to hold the springs 55 in the clutch cover 45. The centrifugal weights 50 are held on the clutch cover 45 by the springs 55 during work for disassembling and assembling the automatic transmission 31, which facilitates work for disassembling and assembling the automatic transmission 31.

A centrifugal friction clutch 60 in a third embodiment according to the present invention included in an automatic transmission will be described with reference to FIGS. 11 and 12, in which parts like or corresponding to those of the first embodiment are denoted by the same reference characters and the description thereof will be omitted. In the first embodiment, the projections 27a of the second spring bearing member 27 are inserted in the circumferential grooves 11d to retain the second spring bearing member 27 on the clutch cover 11 such that the springs 25 are compressed and the centrifugal weights 20 are held in place. In the centrifugal friction clutch 60 in the third embodiment, the second spring bearing member 62 is restrained from coming off a clutch cover 61 by a snap ring 63, i.e., second retaining means, put in an annular groove formed in the inner circumference of the clutch cover 61.

Figure 11:
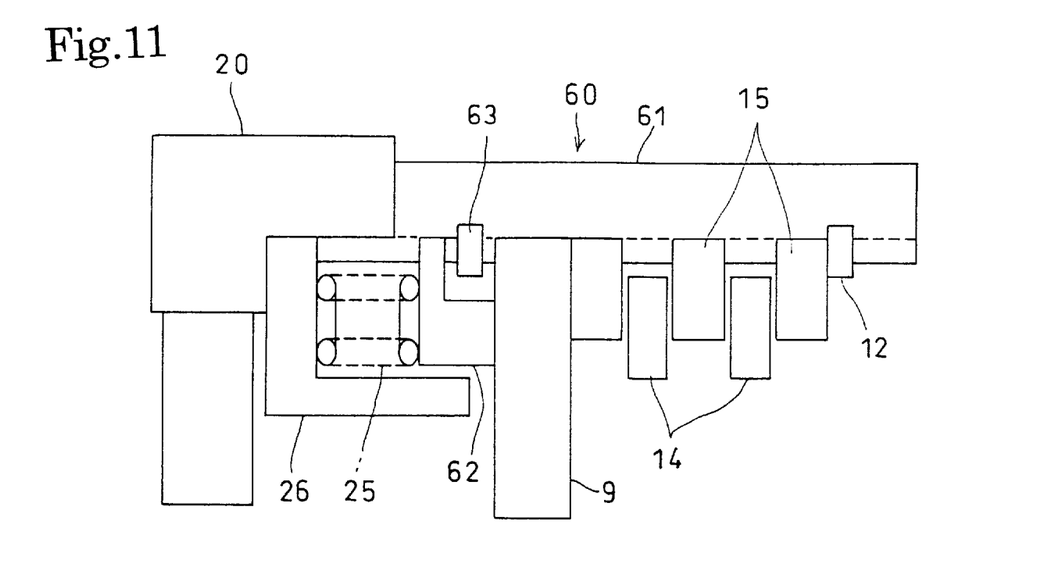
FIG. 11 is a schematic typical view of a centrifugal friction clutch in a third embodiment according to the present invention.
Figure 12:
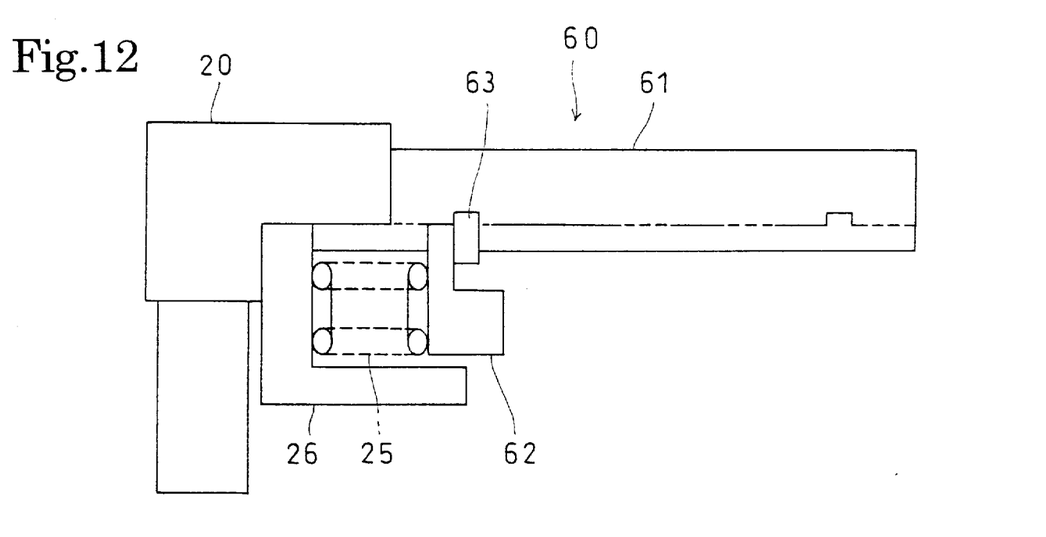
FIG. 12 is a schematic typical view of assistance in explaining a step of an assembling procedure for assembling the centrifugal friction clutch shown in FIG. 11.

While the centrifugal friction clutch 60 is in an inoperative state as shown in FIG. 11, the centrifugal friction clutch 60 is engaged lightly because the springs 25 are compressed slightly. When the engine operates at a very low engine speed, the planetary gear 4 is driven by the driving torque of the engine and the component helical gears of the planetary gear 4 produce thrust. Consequently, the centrifugal friction clutch 60 is disengaged. Thus the output member 3 rotates at a rotating speed lower than that of the input shaft 2 while the centrifugal friction clutch 10 is disengaged.

When the rotating speed of the outer carrier 9 is increased to increase traveling speed, the centrifugal weights 20 are turned radially outward, the first spring bearing member 26 comes into contact with the outer carrier 9, the clutch cover 61 is moved to move the snap ring 12 toward the outer carrier 9 so as to compress the friction disks 14 and the clutch disks 15, so that the centrifugal friction clutch 60 is engaged.

When changing the friction disks 14 and the clutch disks 15 of the centrifugal friction clutch 60 for maintenance, the snap ring 12 is removed, and then the friction disks 14 and the clutch disks 15 are removed from the clutch cover 61. This procedure is reversed to place new friction disks and new clutch disks in the clutch cover 61. During maintenance, the second spring bearing member 62 is retained on the clutch cover 61 by the snap ring 63 and the plurality of centrifugal weights 20 are held in place by the springs 25 as shown in FIG. 12 and hence the plurality of centrifugal weights 20 do not come off the clutch cover 61, which facilitates assembling work A centrifugal friction clutch 70 in a fourth embodiment according to the present invention included in an automatic transmission will be described with reference to FIGS. 13 and 14, in which parts like or corresponding to those of the centrifugal friction clutch 10 in the first embodiment are denoted by the same reference characters and the description thereof will be omitted. When assembling the planetary gear 4 and the centrifugal friction clutch 10 in the first embodiment, the outer carrier 9 pushes the second spring bearing member 27. When assembling the centrifugal friction clutch 70 in the fourth embodiment, projections 27a formed on the outer circumference of the second spring bearing member 27 are inserted in circumferential grooves 71d in the cylindrical wall of a clutch cover 71, and the outer carrier 9 is fitted in the cylindrical wall of the clutch cover 71 such that the outer carrier 9 does not push the second spring bearing member 27 and is spaced from the second spring bearing member 27 when combining the planetary gear 4 with the centrifugal friction clutch 70. Since the planetary gear 4 can be thus combined with the centrifugal friction clutch 70 without affecting the effect of the springs 25 in holding the centrifugal weights 20 in place, the outer carrier 9 can be disposed at an optional, proper position.

Figure 13:
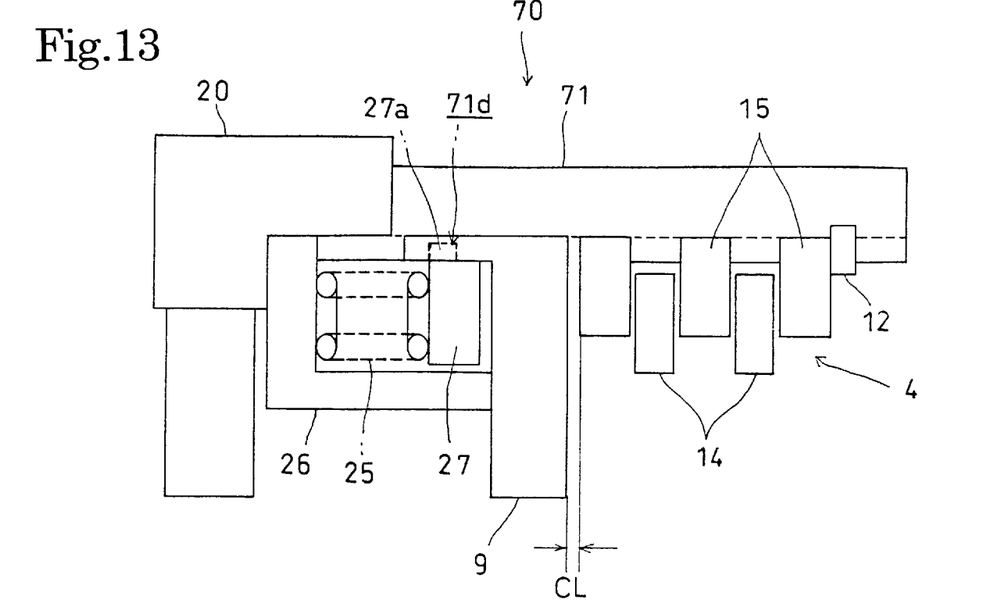
FIG. 13 is a schematic typical view of a centrifugal friction clutch in a fourth embodiment according to the present invention in an inoperative state.

The position of the outer carrier 9 may be determined so that an appropriate clearance CL can be secured between the outer carrier 9 and the clutch plate 15 nearest to the outer carrier 9. Thus, the continuous exertion of pressure on the friction disks 14 and the clutch disks 15 is avoided by securing the clearance CL to prevent the dragging of the centrifugal friction clutch 70 in an initial stage of operation and to extend the life of the friction disks 14 and the clutch disks 15.

Figure 14:
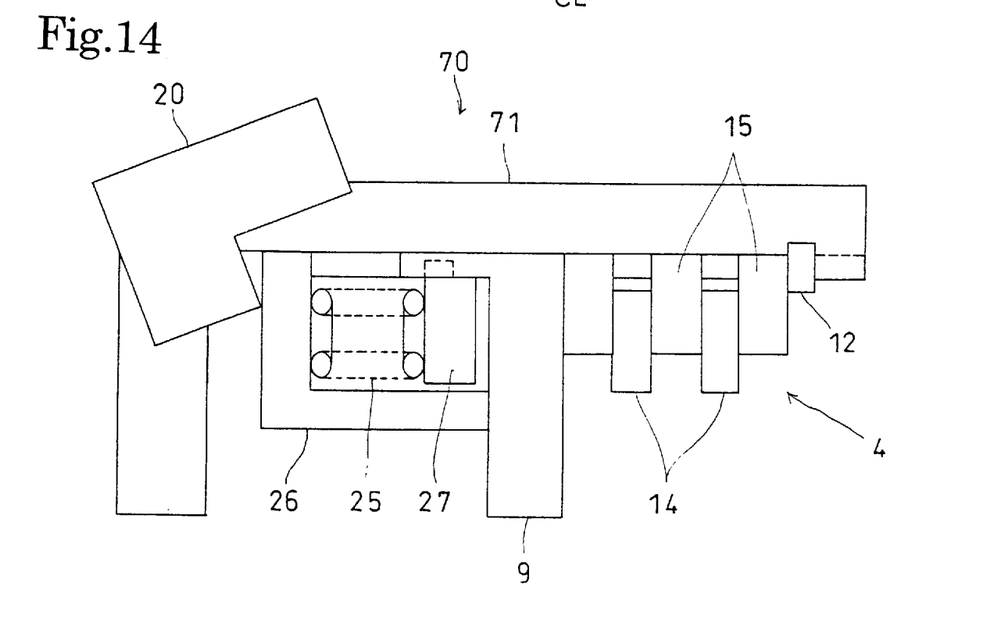
FIG. 14 is a schematic typical view of the centrifugal friction clutch shown in FIG. 13 in operation at a high rotating speed.

As the rotating speed of the input shaft 2 increases, the centrifugal weights 20 are turned radially outward by centrifugal force as shown in FIG. 14 and the clutch cover 71 is moved relative to the outer carrier 9 to reduce the clearance CL to naught, so that the friction disks 14 and the clutch plates 15 are compressed to engage the centrifugal friction clutch 70.

Figure 15:
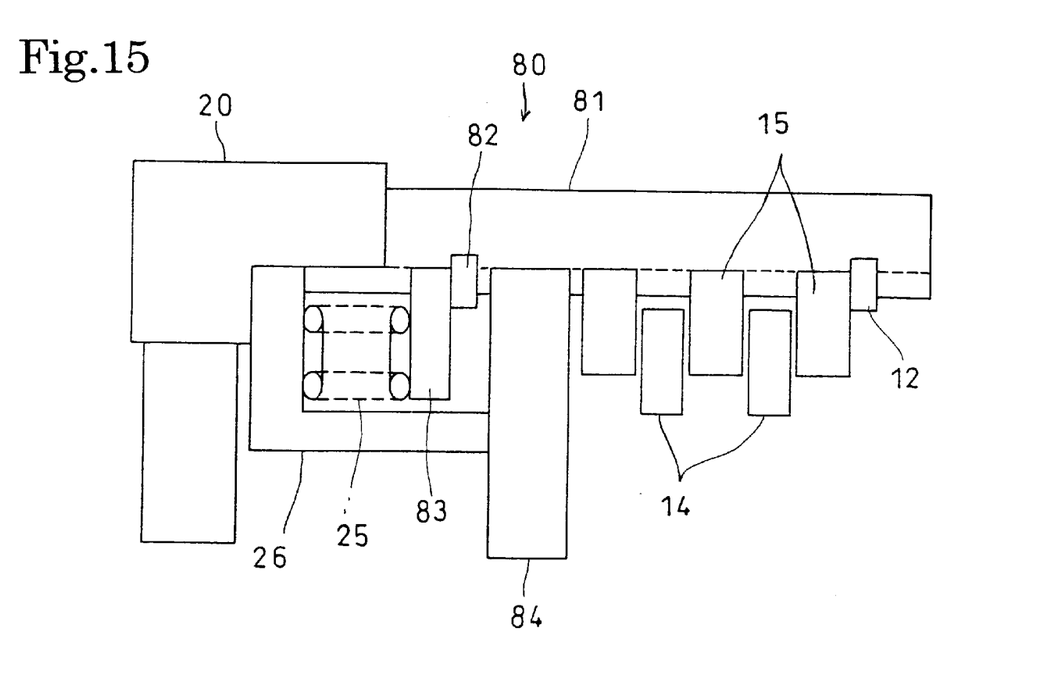
FIG. 15 is a schematic typical view of a centrifugal friction clutch in a fifth embodiment according to the present invention in an inoperative state.

A centrifugal friction clutch 80 in a fifth embodiment according to the present invention is shown in FIG. 15. The centrifugal friction clutch 80 is similar to the centrifugal friction clutch 70 in the fourth embodiment and hence parts of the former like or corresponding to those of the latter are denoted by the same reference characters and the description thereof will be omitted.

In the fourth embodiment, the projections 27a of the second spring bearing member 27 are received in the circumferential grooves 71d formed in the inner circumference of the clutch cover 71 to hold the springs 25 on the clutch cover 71. In the fifth embodiment, a second spring bearing member 83 are retained on a clutch cover 81 by a snap ring 82 as shown in FIG. 15 to hold the springs 25 on the clutch cover 81.

The second spring bearing member 27 of the fourth embodiment is capable of retaining itself on the clutch cover 71 and hence any part to retain the second spring bearing member 27 on the clutch cover 71 is not necessary. However, the second spring bearing member 27 and the outer carrier 9 have complicated shapes, respectively. Although the fifth embodiment needs the snap ring 82 additionally, the component members have simple shapes, respectively, and hence can be manufactured at low manufacturing costs.

In the foregoing embodiments, the first spring bearings 26 and 56 for holding the centrifugal weights 20 and 50 at initial positions have the projections that come into contact with the corresponding outer carriers 9, 39 and 84, and the centrifugal weights 20 and 50 are turned radially outward by centrifugal force to press the first spring bearings 26 and 56 against the outer carriers 9, 39 and 84 restrained from axial movement, respectively, to determine supporting points about which the centrifugal weights 20 and 50 pivot. The supporting points about which the centrifugal weights 20 and 50 pivot may be determined without using the first spring bearing members 26 and 56, and the base portions of the centrifugal weights 20 and 50 may be connected by some other members to determine the supporting points for the same.

For example, in the first embodiment, connecting members may be extended axially slidably through the first spring bearing 26 and the second spring bearing 27 between the base portions 20b of the centrifugal weights 20 and the outer carrier 9 to press the connecting members by the base portions 20b of the centrifugal weights 20 against the outer carrier 9 restrained from axial movement so that the base portions 20b of the centrifugal weights 20 are supported at support points on outer ends of the connecting members for pivotal movement.

Since the base portions 20b of the centrifugal weights 20 turn about the support points, the outer edges of the base portions 20b push the clutch cover 11 to move the clutch cover 11 relative to the outer carrier 9 to engage the centrifugal friction clutch 10. The connecting members may be those formed integrally with the base portions 20b of the centrifugal weights 20, respectively, or may be those fixed to the outer carrier 9.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A centrifugal friction clutch for an automatic transmission, comprising:
    friction elements supported on an input member so as to be axially movable and to be rotated together with the input member;

a clutch cover supported on an output member so as to be axially movable relative to the output member and to rotate together with the output member;

clutch elements supported on the clutch cover so as to be axially slidable;

centrifugal weights disposed at predetermined positions on the clutch cover;

spring members holding the centrifugal weights in place on the clutch cover; and first retaining means put in place on the clutch cover to press the friction members and the clutch members against each other so that power can be transmitted when the centrifugal weights are displaced by centrifugal force to move the clutch cover relative to the output member;

wherein a first spring bearing member placed in contact with one end of each of the spring members urges the centrifugal weights toward their respective predetermined initial positions, and a second spring bearing member placed in contact with the other end of each of the spring members is held in place on the clutch cover by second retaining means engaging the clutch cover, wherein the first and second bearing members are axially movable relative to the input member.

2. The centrifugal friction clutch according to claim 1, wherein the second retaining means is formed integrally with the second spring bearing member.

3. The centrifugal friction clutch according to claim 1, wherein the second spring bearing member is not in contact with the output member and is supported on the clutch cover such that a clearance is secured between the output member and the first retaining means.

* * * * *